United States Patent [19]

Verburgt

[11] 4,428,073

[45] Jan. 24, 1984

[54] UNDERWATER DEPTH TELEMETRY

[75] Inventor: Peter W. Verburgt, Perkasie, Pa.

[73] Assignee: The United States of America as represented by the Secretary of the Navy, Washington, D.C.

[21] Appl. No.: 317,028

[22] Filed: Nov. 2, 1981

[51] Int. Cl.³ ............................................. H04B 11/00

[52] U.S. Cl. ............................... 367/134; 340/870.16; 340/870.26; 367/904; 375/6; 375/48

[58] Field of Search .................... 367/134, 904; 375/6, 375/48, 65, 89; 340/870.16, 870.21, 870.22, 870.26

[56] References Cited

U.S. PATENT DOCUMENTS

| | | | |
|---|---|---|---|
| 3,330,909 | 7/1967 | Willson | 375/48 X |
| 3,860,874 | 1/1975 | Malone et al. | 375/89 |
| 4,005,428 | 1/1977 | Graham | 375/48 X |
| 4,020,449 | 4/1977 | Ito et al. | 367/134 |
| 4,045,767 | 8/1977 | Nishihara et al. | 367/134 |

OTHER PUBLICATIONS

*Sperry Eng. Review,* vol. 19, No. 3, 1966, pp. 25–30.
Baggeroer et al., *Oceans 81 Conference Record,* 16–18 Sep. 1981, pp. 55–60.

*Primary Examiner*—Richard A. Farley
*Attorney, Agent, or Firm*—Robert F. Beers; Henry Hansen; Armand M. Vozzo, Jr.

[57] ABSTRACT

An acoustic telemetry system and technique are disclosed for remotely measuring the underwater depth and descent rate of a hydrographic package. Analog signals indicative of hydrostatic pressure exerted on the package and related to its underwater depth are periodically sampled and converted to an N-bit digital word representative of the value of pressure. Each bit of the digital word operates one of a plurality of tone generators of different acoustic frequencies in a narrow band, and the outputs of the tone generators are combined with a reference tone continuously generated to permit resolution of Doppler shifts. Acoustically projected through the water to a remote hydrophone, a composite signal representative of the combined tones is corrected for Doppler shifts by translating the frequency of the signal in accordance with shifts detected in the reference tone. The composite signal is digitally decoded to reproduce the N-bit digital word using a parallel series of frequency detectors each tuned to one of the narrow band acoustic frequencies, and the word is displayed as an indication of underwater depth using a series of latches to ensure a steady data display.

13 Claims, 3 Drawing Figures

UNDERWATER DEPTH TELEMETRY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to acoustic wave communications and more particularly to an improved electronic system and technique for telemetering underwater depth and descent rate data via an acoustic frequency link.

In the field of underwater telemetry, free-falling hydrographic packages are commonly employed to retrieve and transmit research data pertinent to the nature of an underwater environment. Generally designed to descend in the water at a fixed and stable rate for optimum information retrieval, these hydrographic packages are typically provided with pressure transducers that produce signals indicative of the package's underwater depth for correlation with the research data being retrieved. The underwater depth and descent rate of the hydrographic packages, as signaled by the pressure transducers, are vital to the effective mapping of the retrieved information and must be continuously and accurately monitored throughout the descent of the packages without disrupting their stabilized free-fall through the water.

Various acoustic wave communication systems and associated techniques have been devised and developed to relay sensor data through water for remote measuring and analyzation. However, while such communication systems and techniques have been generally successful in acoustically projecting data underwater, they have not been sufficiently accurate in underwater telemetry operations involving moving acoustical projectors, such as the free-falling hydrographic packages, due to errors induced by the Doppler effect. In addition, existing acoustic wave communication systems have not been easily adapted to present hydrographic operations, generally requiring interfacing that has interfered with the performance of the hydrographic packages and adversely affected stabilization of their free-fall descent.

SUMMARY OF THE INVENTION

Accordingly, it is a general purpose and object of the present invention to provide an improved system and technique for remotely measuring the underwater depth of a hydrographic package without interfering with its operation.

Another object of the present invention is to provide an improved acoustic wave communication system and technique for telemetering the underwater depth and descent rate of a free-falling hydrographic package without disrupting its stabilized free-fall.

Still another object of the present invention is to provide an acoustic wave telemetry system that is highly accurate in measuring the underwater depth of a descending hydrographic package by eliminating errors caused by the Doppler effect.

A further object of the present invention is to provide an underwater depth telemetry system that is easily adapted to and incorporated within existing hydrographic operations without adversely affecting their performance.

A still further object of the present invention is to provide an underwater depth telemetry system that is reliable in operation and relatively inexpensive to manufacture.

Briefly, these and other objects of the present invention are accomplished by an acoustic telemetry system and technique for remotely measuring the underwater depth and descent rate of a hydrographic package. Analog signals indicative of hydrostatic pressure exerted on the package and related to its underwater depth are periodically sampled and converted to an N-bit digital word representative of the value of pressure. Each bit of the digital word operates one of a plurality of tone generators of different acoustic frequencies in a narrow band, and the outputs of the tone generators are combined with a reference tone continuously generated to permit resolution of Doppler shifts. Acoustically projected through the water to a remote hydrophone, a composite signal representative of the combined tones is corrected for Doppler shifts by translating the frequency of the signal in accordance with shifts detected in the reference tone. The composite signal is digitally decoded to reproduce the N-bit digital word using a parallel series of frequency detectors each tuned to one of the narrow band acoustic frequencies, and the word is displayed as an indication of underwater depth using a series of latches to ensure a steady data display.

For a better understanding of these and other aspects of the present invention, reference may be made to the following detailed description taken in conjunction with the drawing in which like reference numerals designate like parts throughout the figures thereof.

DESCRIPTION OF THE PREFERRED EMBODIMENT

Figures 1, 3:
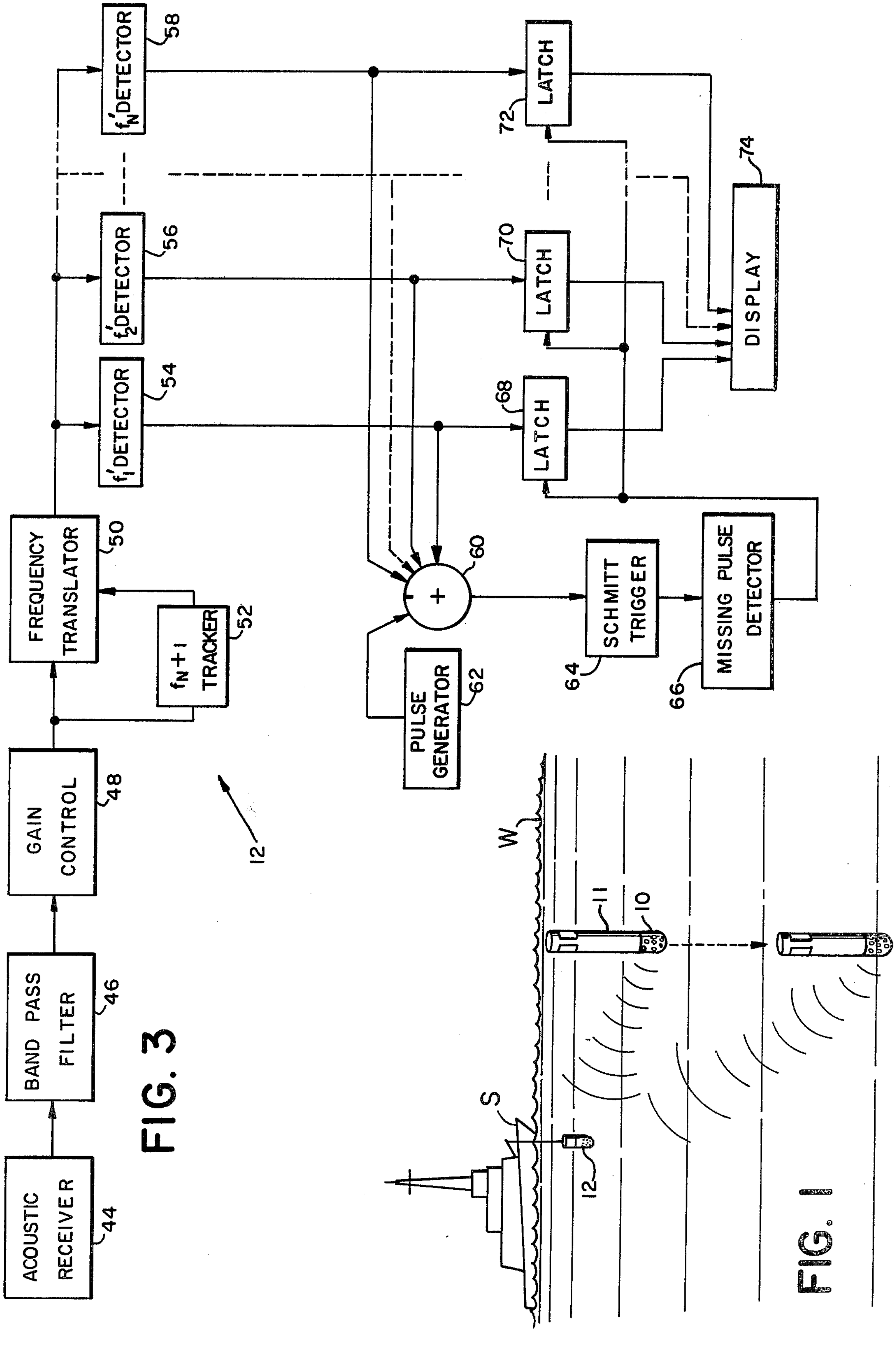
FIG. 1 is a general illustration of the acoustic telemetry system of the present invention shown in its operating environment.
FIG. 3 is a block diagram of signal receiving circuitry of the acoustic telemetry system in accordance with the present invention.

Referring now to FIG. 1, there is shown a cylindrical hydrographic package 11 commonly employed to gather research data regarding the nature of an underwater environment. Dropped into a body of water W from the air or from a surface vessel S, the hydrographic package 11 is typically designed to free-fall through the water (indicated by the dotted arrow) at a slow, stable rate of descent for optimum data retrieval. Attached to hydrographic package 11 at its lower descending end is a self-contained acoustic transmitter unit 10 which, as hereinafter detailed in reference to FIG. 2, continually projects a composite signal comprising a combination of digitally-encoded acoustic frequencies indicative of the hydrostatic pressure exerted on the package during descent. The composite signal projected by transmitter unit 10 also includes a continuously-generated reference frequency that is tracked to permit correction of Doppler shifts in the frequencies of the tones emanating from the moving transmitter unit 10. A hydrophone receiver unit 12, described in greater detail regarding FIG. 3, is deployed in the water W from surface vessel S at a location remote from transmitter unit 10 to acoustically receive the composite signal, correct it for Doppler shifts, and decode the signal for display of the hydrostatic pressure data as an accurate indication of the underwater depth of hydrographic package 11.

Figure 2:
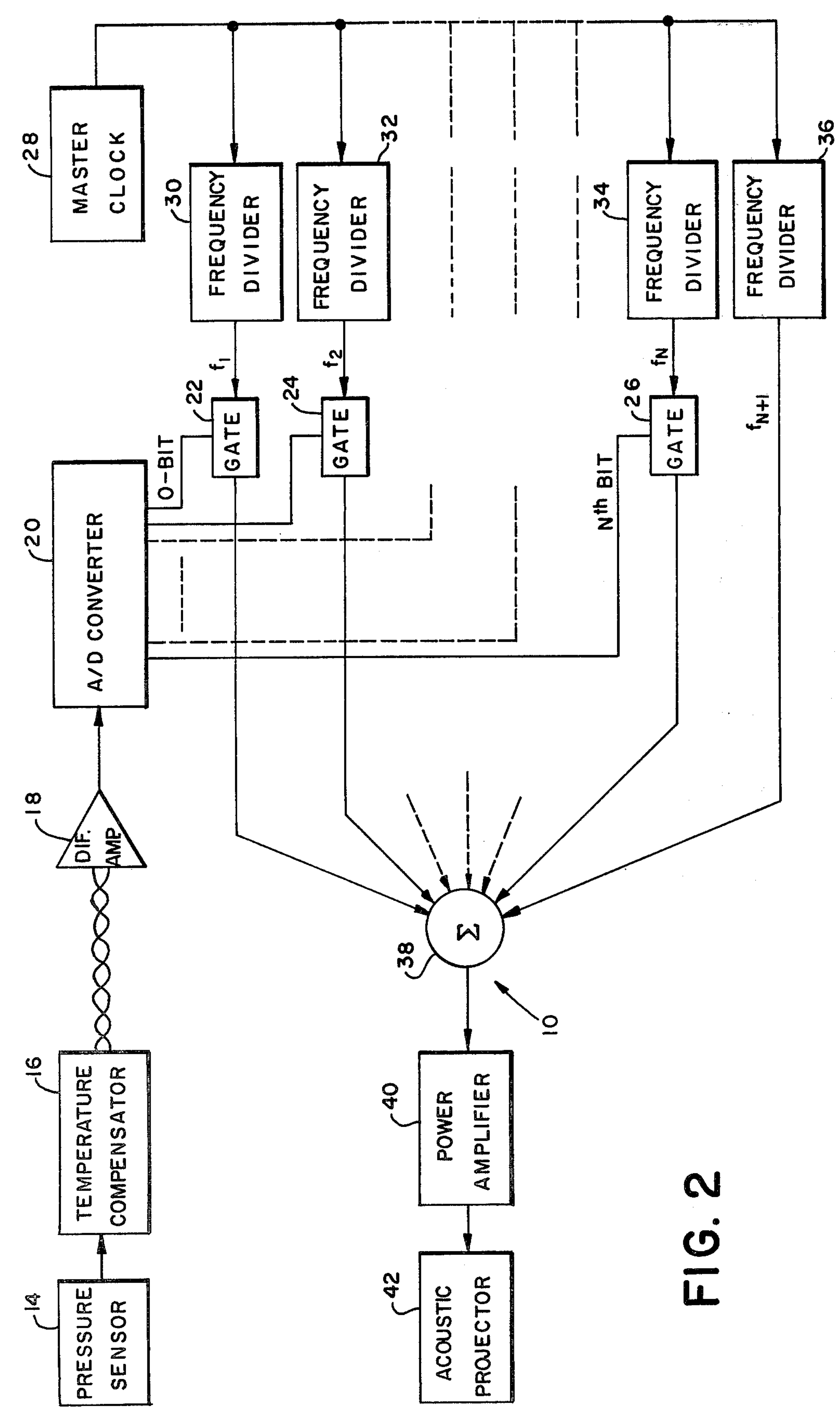
FIG. 2 is a block diagram of signal transmitting circuitry associated with the acoustic telemetry system as shown in FIG. 1.

Referring now to FIG. 2 in conjunction with FIG. 1, the transmitter unit 10 includes a conventional pressure sensor 14 mounted upon the hydrographic package 11 to detect the hydrostatic pressure exerted on the package by the surrounding water medium. The pressure sensor 14 is preferably one having a piezoelectric crystal element in a resistive bridge network balanced at a referenced pressure, typically atmospheric, so that pressure variations sensed by the crystal element produce D.C. voltage changes in the balanced bridge network indicative of the pressure variations. A temperature compensator 16, typically a thermal sensitive resistive element, is electrically coupled to pressure sensor 14 to provide compensation for resistance changes in the peizoelectric crystal due to ambient temperature variations. A differential amplifier 18 of conventional design is electrically coupled to receive the temperature-compensated, pressure-induced voltage changes, serving to detect and enhance their D.C. level so that an analog signal is produced that is indicative of the hydrostatic pressure on package 11 and appropriate for further processing, as described in greater detail hereinafter. To reduce external interference and the errors caused thereby, the electrical coupling at the input of differential amplifier 18 is preferably effected by a twisted cable pair, as illustrated in FIG. 2.

It should be understood that the analog signal indicative of the hydrostatic pressure exerted on package 11 and so produced via pressure sensor 14, temperature compensator 16, and differential amplifier 18 is further related to the underwater depth of the package, and, in accordance with the present invention, is utilized to provde an improved system and technique for underwater depth telemetry. The relation of absolute pressure to underwater depth is given by the equation:

$$P=P_A+{}_0^h pg\,dh$$

where $P_A$ is the atmospheric pressure, h is the underwater depth, p is the mass desnity of the water media, and g is the acceleration due to gravity. For water depths to several thousand feet, sea water may be considered incompressible and an approximate expression for pressure in terms of weight density (w) is $$P=P_A+pgh=P_A+wh$$

If atmospheric pressure ($P_A$) is in pounds per square inch (psi), weight density (w) is in pounds per cubic foot, and h is in feet: then $$P=14.7+0.447\ h\ \text{(psi)}$$

and for pressure sensors calibrated to read guage pressure, $$P=0.447\ h\ \text{(psi)}$$

Accordingly, assuming very small errors in neglecting water compressibility and the temperature effect on the mass density of salt water, either of the two latter equations may be used and incorporated into the presently described invention to convert the hydrostatic pressure indications into underwater depth measurements for the hydrographic package 11.

A conventional analog-to-digital converter 20 is electrically connected to the output of differential amplifier 18 for converting the D.C. level of the analog signal to a multiple-bit digital word. Designed to sample the analog signal continually, about every four seconds, the A/D converter 20 repeatedly outputs a new digital word representative of the hydrostatic pressure on package 11. The digital word is produced by A/D converter 20 at a set of multiple outputs, each output corresponding to a separate bit of the digital word. Represented by N, the number of bits in the digital word may be any whole number and is dependent upon the maximum pressure anticipated during the measurable descent of package 11 and by the desired depth resolution for the particular hydrographic application, a greater number of bits being required for higher values of these parameters. A plurality of digital gates 22, 24 and 26, equal in number to the number of bits in the digital word, are connected to the output of A/D converter 20, each output bit being directed to a respective one of the gates for controlling its on/off state. As described in greater detail hereinbelow, gates 22, 24 and 26, triggered by respective output bits from A/D converter 20, permit control of frequency synthesization of a composite acoustic signal used to telemeter underwater depth in accordance with the present invention.

Acoustic tone generation in the transmitter unit 10 is provided by a master clock 28 which produces a high-frequency square wave output connected for parallel distribution to a plurality of frequency dividers 30, 32, 34 and 36 of conventional digital design. The number of frequency dividers 30, 32, 34 and 36 is one more than the number of bits in the digital word (N+1) outputted from A/D converter 20, each divider counting down the square wave frequency of master clock 28 to produce a different acoustic frequency ($f_1$, $f_2$—$f_N$, $f_{N+1}$). The N+1 acoustic frequencies so produced by the dividers 30, 32, 34 and 36 are located within a narrow audio band and are frequency-separated by a small differential, typically about 10 Hz.

The outputs of frequency dividers 30, 32 and 34 are connected to respective gates 22, 24 and 26 wherein the associated acoustic frequencies ($f_1$, $f_2$—$f_N$) are gated in accordance with the respective output bits from A/D converter 20. Typically, a "high" output bit (binary "1") from A/D converter 20 turns the associated gates 22, 24 and 26 "on", permitting passage of the respective acoustic frequency, while a "low" output (binary "0") from the converter turns the gates "off" thereby blocking frequency passage. Accordingly, the presence or absence of the gated acoustic frequencies ($f_1$, $f_2$,—$f_N$) provides an indication of the value of the digital word outputted from A/D converter 20, and thus, a digital indication of the underwater depth of package 11 as it relates to hydrostatic pressure.

The output of frequency divider 36 is not gated and is connected directly to a summing device 38 thereby continuously providing a reference acoustic frequency ($f_{N+1}$) that is tracked and used to resolve frequency shifts in transmission due to the Doppler effect, as is described in greater detail regarding FIG. 3. Summing device 38 is also connected to receive the outputs of gates 22, 24 and 26, combining the gated acoustic frequencies ($f_1$, $f_2$,—$f_N$) with the reference frequency ($f_{N+1}$) to produce a composite acoustic signal representative thereof. The composite signal provided at the output of summing device 38 is amplified via power amplifier 40 and transmitted into the water W via an acoustic projector 42, preferably omnidirectional. It should be understood that power for the transmitter unit 10 may be supplied by a separate battery (not shown), the battery being preferably activated by water immersion.

Referring now to FIG. 3 in conjunction with FIG. 1, the hydrophone receiver unit 12 of the present invention includes an acoustic receiver 44 to collect broadband acoustic signals underwater. A conventional band pass filter 46 is connected to receive the signals collected by acoustic receiver 44 and serves to eliminate all but the narrow band of acoustic frequencies ($f_1-f_{N+1}$) of the composite signal projected by transmitter unit 10. From band pass filter 46, the narrow band composite signal is fed to an automatic gain control circuit 48 of conventional design to provide the composite signal with a substantially constant amplitude level that facilitates further processing.

A frequency translator circuit 40, preferably a conventional analog frequency multiplier which operates to produce output frequencies based upon the sums and differences of its input frequencies, is connected to the output of gain control circuit 48 for shifting the substantially-fixed amplitude composite signal into a lower frequency band to facilitate frequency separation of its components. A reference frequency tracker 52 also connected to receive the composite signal from the gain control circuit 48 is designed to detect and track the continuously-generated reference frequency component ($f_{N+1}$) shifted in transmission due to the Doppler effect. The reference frequency tracker 52, typically a conventional phase locked loop detection circuit, is further designed to produce a periodic output signal, such as a square wave, having a frequency corresponding to the Doppler-shifted reference frequency, and is electrically connected to feed its output signal to frequency translator circuit 50 to provide the basis for the degree of frequency translation imposed upon the composite signal with substantial cancellation of the Doppler shift in its components. It should be understood that since the acoustic frequency components ($f_1$, $f_2$,—$f_{N+1}$) of the composite signal are in a relatively narrow band, the frequency shifts in all components due to the Doppler effect are substantially the same. Thus, the Doppler-shifted reference frequency component detected by tracker 52, when used, as described, as the basis for frequency translation of the composite signal, serves to null out the Doppler shifts in all the individual acoustic frequency components of the composite signal thereby providing translated components ($f_1'$, $f_2'$,—$f_N'$) always having the same frequencies to aid in their detection.

A plurality of frequency detectors 54, 56 and 58, equal in number of bits in the digital word produced at the A/D converter 20 of transmitter unit 10 (FIG. 2), are connected in parallel to the output of frequency translator circuit 50. Each of the frequency detectors 54, 56 and 58 is of the phase locked loop type and is respectively tuned to the translated acoustic frequencies ($f_1'$, $f_2'$,—$f_N'$). Based upon the presence or absence of the tuned acoustic frequency, the frequency detectors 54, 56 and 58 are conventionally designed to output a "high" (binary "1") or "low" (binary "0") digital data state, respectively, thereby reproducing the depth-related digital word initially produced at the output of A/D converter 20 of transmitter unit 10.

A plurality of digital latches 68, 70 and 72, one each for the number of bits in the reproduced digital word, are connected to receive the "high" or "low" data states outputted by respective frequency detectors 54, 56 and 58 for display purposes. To ensure that only steady data states are accepted and displayed via latches 68, 70 and 72, digital control circuitry is coupled to the latches including an OR gate 60, Schmitt trigger 64, and missing pulse detector 66 connected in a series network.

OR gate 60 is connected to receive the individual data states as outputted from frequency detectors 54, 56 and 58, digitally combining the data to produce a "high" level output signal when any data state is "high" as indicative of the presence of incoming data. Connected to receive the output signal of OR gate 60, the Schmitt trigger 64 provides a pulsed output signal compatible as an input trigger for missing pulse detector 66. The output of missing pulse detector 66 is designed to be "low", preventing latches 68, 70 and 72 from accepting data as long as periodically, typically about every one-half second, the detector is triggered by an input pulse from Schmitt trigger 64, indicative of a lack of any steady data states. In the event that there is no input trigger to missing pulse detector 66, indicating the presence of incoming data, the output of the detector is designed to pulse "high" causing the latches 68, 70 and 72 to accept the data from frequency detector 54, 56 and 58. Once accepted by latches 68, 70 and 72, the data is available for feeding to a conventional digital display 74 as an indication of underwater depth.

A conventional pulse generator 62 designed to produce a periodic output pulse, preferably about one pulse per second, is connected to feed its output to OR gate 60. In conjunction with Schmitt trigger 64 and missing pulse detector 66, pulse generator 62 acts as a display reset, causing the latches 68, 70 and 72 to accept "low" data states from frequency detectors 54, 56 and 58, respectively.

Therefore, it is apparent that the disclosed invention provides an improved acoustic telemetry system and technique for remotely measuring the underwater depth and descent rate of a free-falling hydrographic package without interfering with its operation or disrupting its stabilized descent. Furthermore, the disclosed acoustic telemetry system and technique provides a high degree of accuracy in measuring the underwater depth of the descending package by resolving frequency-shifting errors induced by the Doppler effect. In addition, the present invention is reliable in operation, relatively inexpensive to manufacture, and easily adapted to and incorporated within existing hydrographic operations without adversely affecting their performance.

Obviously, other embodiments and modifications of the present invention will readily come to those of ordinary skill in the art having the benefit of the teachings presented in the foregoing description and drawings. It is therefore to be understood that various changes in the details, materials, steps, and arrangement of parts, which have been described and illustrated to explain the nature of the invention, may be made by those skilled in the art within the principle and scope of the invention as expressed in the appended claims.

What is claimed is:

1. An acoustic system for telemetering the underwater depth of a hydrographic package, comprising:

transducer means adapted to be mounted upon the hydrographic package for producing an analog signal indicative of the hydrostatic pressure exerted on the package and related to the underwater depth thereof;

converter means electrically coupled to said transducer means for converting the analog signal to an N-bit digital word;

frequency synthesizer means electrically connected to said converter means for generating a composite acoustic signal digitally encoded in accordance with the N-bit digital word;

transmitter means electrically coupled to said frequency synthesizer means for acoustically projecting the composite signal underwater;

hydrophone means acoustically coupled to said transmitter means for receiving the composite signal under water;

frequency detector means electrically coupled to said hydrophone means for digitally decoding the composite acoustic signal to reproduce the N-bit digital word as an indication of the underwater depth; and display means electrically connected to said frequency detector means for displaying the steady data state of the N-bit digital word as an indication of the underwater depth of the package.

2. An acoustic telemetry system according to claim 1, wherein said frequency synthesizer means comprises:

frequency generator means electrically coupled to said converter means for generating N-different acoustic frequencies and a separate reference frequency in a narrow audio band;

a plurality of digital gates connected between said converter means and said frequency generator means to gate the N-different acoustic frequencies using respective bits of the digital word; and a summer electrically connected to said digital gates and to said frequency generator means for combining the gated frequencies with the reference frequency to produce a composite acoustic signal.

3. An acoustic telemetry system according to claim 2, wherein said frequency generator means comprises:

a master clock for producing a high-frequency square wave; and a plurality of frequency dividers connected in parallel to said clock for producing N+1 different acoustic frequencies in a narrow audio band.

4. An acoustic telemetry system according to claim 2, wherein said frequency detector means comprises:

tracking means electrically connected to said hydrophone means for detecting the reference acoustic frequency of the composite signal;

frequency translator means electrically connected to said hydrophone means and said tracking means for translating the acoustic frequencies of the composite signal based upon the detected reference frequency; and a plurality of frequency detectors electrically connected in parallel to said frequency translator means, each detector being tuned to a respective translated acoustic frequency corresponding to one of the acoustic frequencies of the composite signal for producing a digital data indicative of the presence or absence of the tuned frequency.

5. An acoustic telemetry system according to claim 4, wherein said frequency translator means comprises:

an analog frequency multiplier electrically connected to said hydrophone means to receive the composite acoustic signal.

6. An acoustic telemetry system according to claim 5, wherein said plurality of frequency detectors are phase locked loop detection circuits.

7. An acoustic telemetry system according to claim 6, wherein said tracking means comprises:

a phase locked loop detection circuit.

8. An acoustic telemetry system according to claim 1, wherein said display means comprises:

a plurality of latches electrically connected to receive the digital data from respective ones of said frequency detectors;

a digital display electrically connected to receive the data from said latches; and digital means connected to said latches for controlling the flow of the data received by said latches to ensure a steady data display.

9. An acoustic telemetry system according to claim 8, wherein said digital means comprises:

an OR gate electrically connected to receive the digital data outputs of said frequency detectors;

a Schmitt trigger circuit connected to said OR gate to produce an output signal indicative of the state of the digital data; and a pulse detector connected to said Schmitt trigger circuit and said latches for controlling the operation of said latches based upon the pulsed output signal of said Schmitt trigger circuit.

10. An acoustic telemetry system according to claim 9, wherein said display means further comprises:

pulse generator means electrically connected to said OR gate to produce a periodic pulse signal for reseting said display.

11. An acoustic technique for telemetering the underwater depth of a hydrographic package, comprising the steps of:

producing an analog signal indicative of the hydrostatic pressure exerted on the package and related to the underwater depth thereof;

converting the analog signal to an N-bit digital word;

synthesizing a composite acoustic signal digitally encoded in accordance with the N-bit digital word;

acoustically projecting the composite signal underwater;

acoustically receiving the composite signal underwater;

digitally decoding the composite acoustic signal to reproduce the N-bit digital word as an indication of the underwater depth; and displaying the steady data state of the N-bit digital word as an indication of the underwater depth of the package.

12. An acoustic telemetry technique according to claim 11 wherein said step of synthesizing comprises:

generating N-different acoustic frequencies and a separate reference frequency in a narrow audio band;

gating the N-different acoustic frequencies using respective bits of the digital word; and combining the gated frequencies with the reference frequency to produce a composite acoustic signal.

13. An acoustic telemetry technique according to claim 12, wherein said step of digitally decoding comprises:

detecting the reference acoustic frequency of the composite signal;

translating the acoustic frequencies of the composite signal based upon the detected reference frequency;

detecting respective ones of the translated acoustic frequencies; and producing digital data indicative of the presence or absence of each of the translated frequencies.

* * * * *